UNITED STATES PATENT OFFICE.

ROBERT H. ISBELL, OF NEW MILFORD, CONNECTICUT.

IMPROVEMENT IN PROCESSES OF PREPARING WOOD FOR THE MANUFACTURE OF BUTTONS.

Specification forming part of Letters Patent No. 134,286, dated December 24, 1872; reissue No. 5,694, dated December 23, 1873; application filed November 5, 1873.

*To all whom it may concern:*

Be it known that I, ROBERT H. ISBELL, of New Milford, in the county of Litchfield and State of Connecticut, have invented certain Improvements in the Preparation of Wood for the Manufacture of Buttons, of which the following is a specification.

This invention relates to the preparation of wood for the manufacture of buttons; and consists in the treatment of the material with a solvent for removing the albuminous matter, and the subsequent charging of the said material with gum-lac or japan; also, in softening the material thus treated by the action of steam, preparatory to giving shape by pressure to the material; also, in polishing the material during its final shaping by pressure in a die with a rotating punch, the revolving pressure turning a hard bright surface upon the face of the button.

For the blanks of buttons I use thoroughly-seasoned wood, the fiber of which is tough and close, maple, box, pear, and apple tree being suitable for the purpose. The material is first sawed into square strips, a little larger in diameter than the blanks. From these strips, crosswise, the blanks are sawed, and should be double the thickness of the finished button. They are then turned in a lathe to nearly the form of the finished button. The blanks are then soaked in a weak solution of hydrate of soda to remove the albumen, and then thoroughly washed in water. These blanks are then placed in a vessel with a steam-tight cover, and then covered with gum-lac, or, instead of this, with ordinary painter's japan dissolved in alcohol, the cover secured, and 284° Fahrenheit heat applied until a pressure of fifty pounds per inch is obtained, the heat being then regulated to keep the pressure at that point, or until the blanks sink in the varnish. This treatment forces the gum into the wood, filling all the ducts and thoroughly impregnating the fibers, the alcohol extracting from the wood the soluble parts, which rise to the top, the wood absorbing and retaining the gum. The cover of the vessel is then removed, and the temperature reduced to 174° until the alcohol is evaporated; then further reduced to 90°, until the gum is well absorbed by the wood and the blanks are quite dry. The blanks are then put into a steam-box, and heated with steam at a pressure of two pounds to the square inch, until the wood and gum are moderately soft. They are then taken, while hot, and pressed in a die with a revolving or rotating punch to one half the thickness of the blank. This forces all the fiber together, and leaves the button hard and similar to horn in appearance, with a finely-finished face.

In lieu of gum-lac, japan, resinous varnishes, &c., may be used, but with such the results are not as good. The blanks may also be impregnated by simply boiling in an open vessel; but this requires more time, and does not force the lac into the ducts and fibers as thoroughly as the method previously herein described. Moreover, the after heating by steam prepares the lac for retaining the fibers in their compressed state.

It is desirable that the albumen and other soluble matter should be removed from the wood, to prevent any action of the same on the gum-lac, or any interference with its absorption by the wood. The pressure applied with a revolving or rotary motion turns the fibers over and knits them together more effectually than if the pressure were applied directly downward, as this latter would only press them endwise, and would not destroy the line of fracture, or split seams, so called. This revolving pressure greatly facilitates the filling up of all the pores, ducts, &c., of the wood, and forms a hard, bright, enamel-like surface upon the face of the button.

What I claim as my invention is—

1. The method of preparing wood for the manufacture of buttons by first removing the albuminous matter by means of a solvent, and subsequently causing the material to absorb gum-lac or japan, substantially as and for the purpose set forth.

2. The blanks for the manufacture of buttons, prepared as described, and treated with steam in a steam-box, substantially as and for the purpose set forth.

3. As a finishing process in the manufacture of buttons from wood, vegetable ivory, &c., the facing of such buttons by means of a rotating punch or mandrel acting under pressure, substantially as set forth.

ROBERT H. ISBELL.

Witnesses:
JOHN S. TURRILL,
STANLEY L. WARNER.